Sept. 2, 1958
W. G. DUDLEY ET AL
2,850,640
CHLORINE ANALYZER
Filed May 17, 1954
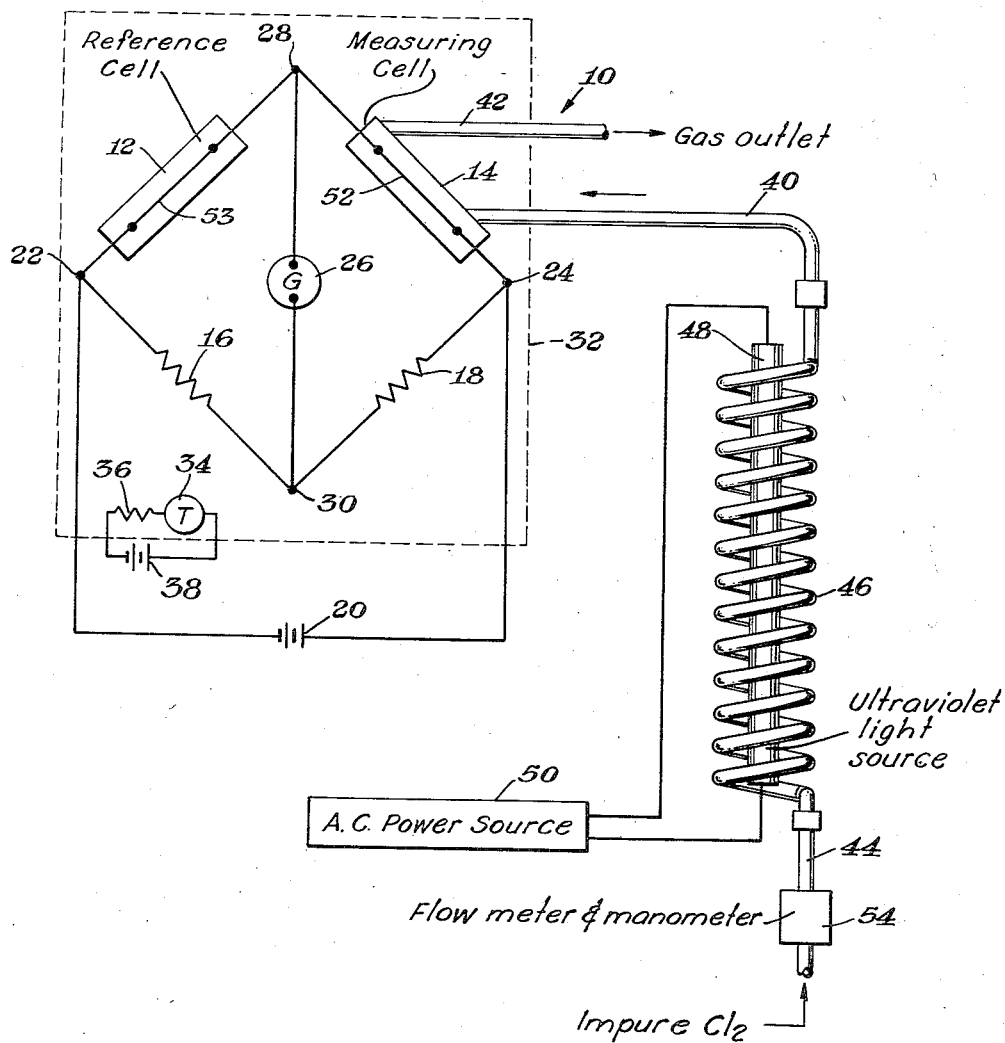
INVENTORS
William G. Dudley
Bernard F. Poetker
BY
Griswold & Burdick
ATTORNEYS 2,850,640
Patented Sept. 2, 1958

2,850,640

CHLORINE ANALYZER

William G. Dudley, Houston, and Bernard F. Poetker, Freeport, Tex., assignors to The Dow Chemical Company, Midland, Mich., a corporation of Delaware Application May 17, 1954, Serial No. 430,114

4 Claims. (Cl. 250—43.5)

This invention relates to a method of and apparatus for determining the concentration of chlorine in the presence of impurities.

Thermal conductivity measurements have been used for some time for measuring the concentration of chlorine in a gas mixture, but this method has not been entirely satisfactory because frequent recalibration of the measuring equipment has been found to be necessary.

It has been determined that recalibration of the chlorine analyzing or measuring equipment has been necessitated by changes in the amount of molecular hydrogen which is present in the gas mixture as an impurity. Because of the high specific heat of hydrogen compared with that of the other impurities in the mixture, the analytical error due to small changes in the amount of molecular hydrogen which is present is out of proportion to the change in the concentration of the hydrogen in the mixture. Because chlorine-hydrogen mixtures react explosively in a spontaneous manner in certain critical concentrations, it can be appreciated that an accurate indication of the concentrations of the gases in the mixture is highly desirable.

In the past, when accurate indication of the concentration of chlorine has been required, the usual thermal conductivity analysis was commonly done, and then the amount of hydrogen separately determined after the chlorine was removed. This method, while accurate, is a multiple step method which is not as rapid as desired and does not give results which read directly in terms of the concentration of chlorine which is present.

It is accordingly, an object of this invention to provide an improved, direct reading chlorine analyzer.

Another object of this invention is to provide an improved method of determining the concentration of chlorine in the presence of hydrogen and other impurities.

An additional object of this invention is to provide an improved, direct reading chlorine analyzer whose accuracy is substantially independent of the amount of hydrogen present in the gas being analyzed.

In accordance with the present invention, the gas being analyzed is subjected to ultraviolet radiation prior to passing through the thermal conductivity analyzer. In the presence of ultraviolet radiation, the molecular hydrogen which is present combines with chlorine to form HCl gas whose thermal conductivity is considerably less than that of molecular hydrogen. The effect of HCl gas on the accuracy of the thermal conductivity analysis of chlorine concentration in the gas mixture is negligible.

In this manner, an accurate, simplified and direct reading chlorine analyzer is provided.

The invention, as well as additional objects and advantages thereof will best be understood when the following detailed description is read in connection with the accompanying drawing, in which:

Fig. 1 is a diagrammatical view of a chlorine analyzer which is constructed in accordance with the present invention.

In Fig. 1 a thermal-conductivity type chlorine analyzer bridge 10 comprises a standard or reference gas cell 12 and a measuring gas cell 14 as two of the legs of a Wheatstone bridge. Two resistors, 16 and 18, comprise the other legs of the bridge. The energizing potential for the bridge is obtained from the source 20, illustrated as a battery, and is connected to the junction 22 between the resistor 16 and the standard gas cell 12 and the junction 24 between the measuring gas cell 14 and the resistor 18. A galvanometer 26 is connected across the junction 28 between the cells 12, 14 and across the junction 30 between the resistors 16, 18. The bridge circuit is enclosed in a box-like container indicated by the dotted lines 32 in which the temperature is thermostatically controlled, by a heater unit comprising the thermostat 34, resistance heater 36 and source of potential 38. The gas to be analyzed is fed into the measuring cell 14 through the glass tube 40 and away from the cell 14 by the tube 42. The reference or standard cell 12 is usually, but not necessarily, a sealed unit.

The gas which is to be analyzed, typically the chlorine rich anode gas from an electrolytic brine cell, is passed through a flow meter and manometer 54 to show the flow rate and pressure, through the tubing 44 and a coil 46 to the tubing 40 through which it is applied to the measuring cell 14. The coil 46 is composed of a glass, such as Vycor, which readily transmits ultraviolet light. A source of ultraviolet or "black" light, illustrated as the cylindrical tube 48, is inserted within the hollow core of the coil 46 and connected to a power source 50.

The chlorine analyzer of the invention functions as follows: As the hydrogen-containing chlorine gas passes through the irradiated coil 46, the molecular hydrogen is combined with chlorine to form HCl gas. Since HCl gas has approximately the same thermal conductivity characteristics as do the other impurities in the mixture, the disproportionate error due to the presence of molecular hydrogen in the mixture is eliminated.

The gas mixture, which contains HCl instead of molecular hydrogen as an impurity, is then passed into the gas measuring cell 14 through the tube 40. Since the temperature of the Wheatstone bridge is thermostatically controlled, changes in the resistance of the wire 52 in the measuring cell 14 may be attributed to a change in heat absorption in the surrounding gas, that is, to the thermal conductivity of the gas passing through the measuring cell 14 rather than to a change in the ambient temperature. Gas leaves the measuring cell 14 through the tube 42 where it is returned to a collecting vessel or otherwise disposed of.

Because the thermal conductivity of the reference cell 12 is known and has a constant value at any reference temperature, the resistance value of the filament 53 in that cell will remain constant after the analyzer temperature has reached an equilibrium value which is determined by the thermostatically controlled heater 36. Presumably the values of the resistors 16 and 18 are so proportioned that when a gas, which is the same as the gas in the reference cell, passes through the measuring cell, the bridge is balanced and no current flows through the galvanometer 26. However, a gas having thermal conductivity characteristics which are different from those of the gas in the reference cell 12, will unbalance the bridge and current will flow through the galvanometer 26, the amount of current depending on the amount of imbalance due to a change in resistance in the measuring cell 14.

Although not so shown in the drawing, the inlet and outlet tubes 40 and 42 are often coupled to the cell 14 through a thermally insulating coupling in order to reduce the heat loss through the tubing 40 which extends outside the thermostatically controlled analyzer housing represented by the dotted lines 32. Likewise, if it is desired to increase the sensitivity of the analyzer, the resistor 16 could be replaced by a gas measuring cell which is in series with the cell 14, and the resistor 18 replaced by a standard gas cell like the cell 12.

The time required to completely combine the hydrogen with chlorine to form HCl gas depends on the wave length of the light used in irradiating the gas mixture and upon the time the gas mixture is irradiated. For example, chlorine absorbs about 72½ percent of ultraviolet light of about 3300 angstroms wavelength while it absorbs only 20 percent at light wave lengths of 2800 and 3860 angstroms, respectively. The absorption rates between the peak wave length of 3300 angstroms and the 20 percent absorption wave lengths can be estimated by plotting a graph having a smooth curve between the 20 percent points and the peak point.

With an 8 watt ultraviolet light as the irradiating source, it was found in practice that nearly 100 percent of the hydrogen would be combined with chlorine if the gas mixture was exposed, in a Vycor glass coil around the tubular ultraviolet light source, for a period of one-half second or more. To assure complete combination of the hydrogen with chlorine under changing conditions such as slight variations in the wave length of the irradiating light, and changes in hydrogen concentration and pressure of the gas mixture, an exposure time of 5 seconds to ultraviolet light has been found to be completely satisfactory when an 8 watt bulb was used in the above-described manner.

It is sometimes advantageous, to avoid securing unambiguous results with moisture containing gas, to reduce the moisture content of the gas stream by passing the stream through a dehydrating agent which may be of any suitable known type.

If it be desired to provide a hydrogen analyzer rather than a chlorine analyzer, the standard gas cell could be replaced by a cell through which gas is fed directly from the flow meter and manometer 34, while gas which has passed through the ultraviolet light irradiated coil 46 is fed through the measuring cell. With such an instrument, any imbalance in the bridge circuit results from the removal of hydrogen as HCl, providing an indication of the amount of molecular hydrogen which is present in the gas.

While the invention has been described in connection with irradiating the gas mixture with ultraviolet light, it has been determined that blue light, though less efficient than ultraviolet light, can be substituted if appropriate increases in light wattage or time of exposure of the gas to the light are made.

While only a single type of thermal conductivity analyzer has been illustrated in the drawing, other analyzers using the principles of this invention will suggest themselves to those skilled in the art. For example, recording type bridge instruments could easily be adapted for use in this invention.

We claim:

1. The method of determining the concentration of chlorine in a gas comprising principally chlorine but having molecular hydrogen as an impurity, comprising the steps of subjecting the gas to ultraviolet radiation, dehydrating the gas, and then measuring the thermal conductivity of the gas.

2. A method in accordance with claim 1, wherein said ultraviolet radiation has a wavelength of between 3100 and 3500 angstroms and the gas is subjected to such radiation for at least a half second.

3. A method in accordance with claim 1, wherein said gas is subjected to ultraviolet radiation having a wavelength of approximately 3300 angstroms for at least a half second.

4. A thermal conductivity type chlorine analyzer comprising a bridge circuit having arms which include a reference gas cell containing chlorine, a measuring gas cell, galvanic means connected across part of said circuit for measuring potential imbalance therein, potential means for energizing said bridge circuit, means including gas flow and pressure control devices for applying a gas mixture to be analyzed to said measuring cell, and irradiating means including a source of ultraviolet light for subjecting said gas mixture to radiation prior to its passage through said measuring cell.

References Cited in the file of this patent

UNITED STATES PATENTS

| | | |
|---|---|---|
| 1,430,035 | Snelling | Sept. 26, 1922 |
| 2,161,045 | Hirschkind et al. | June 6, 1939 |
| 2,433,554 | Herzog | Dec. 30, 1947 |
| 2,617,940 | Giguere | Nov. 11, 1952 |
| 2,687,342 | Strange et al. | Aug. 24, 1954 |

OTHER REFERENCES

The Chemical Action of Ultraviolet Rays, By Ellis and Wells, Reinhold Publishing Corp., New York, N. Y., a copyright 1941, pgs. 281–291 (Chap. 18).